US006155811A

United States Patent [19]

Looije et al.

[11] Patent Number: 6,155,811

[45] Date of Patent: Dec. 5, 2000

[54] STACK MOLD CARRIER MOUNTED ON LINEAR BEARINGS

[75] Inventors: Peter A Looije, Newmarket; Pradheep Anthony Sabapathy, Scarborough; John Di Simone, Woodbridge; William S Keir, Aurora, all of Canada

[73] Assignee: Husky Injection Molding Systems Ltd., Canada

[21] Appl. No.: 09/391,547

[22] Filed: Sep. 8, 1999

[51] Int. Cl.[7] .................................................... B29C 45/64

[52] U.S. Cl. .......................... 425/190; 425/338; 425/451; 425/451.5; 425/589; 425/592

[58] Field of Search .................................... 425/190, 338, 425/450.1, 451, 451.5, 451.6, 588, 589, 592, 593

[56] References Cited

U.S. PATENT DOCUMENTS

| | | | |
|---|---|---|---|
| 4,207,051 | 6/1980 | Wright et al. | 425/556 |
| 4,408,981 | 10/1983 | Brown | 425/589 |
| 4,929,166 | 5/1990 | DiSimone et al. | 425/190 |
| 5,211,798 | 5/1993 | Keller | 156/500 |
| 5,354,196 | 10/1994 | Ziv-Av | 425/589 |
| 5,707,666 | 1/1998 | DiSimone et al. | 425/588 |

*Primary Examiner*—Tim Heitbrink
*Assistant Examiner*—Donald Heckenberg
*Attorney, Agent, or Firm*—Bachman & LaPointe, P.C.

[57] ABSTRACT

The present invention relates to a carrier assembly for supporting the mold center section of a stack mold. The carrier assembly has a pair of mold supports to which the mold center section can be attached. Each mold support is movable along a linear rail attached to the base of a molding machine and has at least one block containing a linear bearing mounted thereto for engaging the linear rail. Each mold support further includes a linkage assembly for connecting the mold support to other platens so as to synchronize movement of each mold support with movement of at least one other platen.

18 Claims, 3 Drawing Sheets

20
22
30
30
12
24
26
24
16
18
28
26
14
10

STACK MOLD CARRIER MOUNTED ON LINEAR BEARINGS

BACKGROUND OF THE INVENTION

The present invention relates to an improved stack mold center section carrier for a molding machine.

Stack mold systems for molding articles are known in the prior art. One such stack mold system is shown in U.S. Pat. No. 4,207,051 to Wright. The Wright stack mold system has tiebars which pass through the mold plates, thereby supporting them directly. Removing the molds from the machine requires the tiebars to be withdrawn. This is a time consuming process which requires additional space behind the molding machine's clamp to accommodate the tiebars in their withdrawn positions.

Early stack mold carriers were attachments to the mold center section that supported it in the molding machine and allowed the center section to slide along the machine's tiebars. U.S. Pat. No. 4,408,981 to Brown shows a carrier riding on the lower tiebars. Removal of the mold also required removal of the carriers as they were not attached to the machine. This was an added complication taking more time to change the mold.

U.S. Pat. No. 4,929,166 to DiSimone et al. shows a similar carrier riding between the upper and lower tiebars so that removal of the mold leaves the carrier in place between the tiebars on the machine. The carrier remains attached to the machine by virtue of the half shoe bearings acting on both the upper and lower tiebars. This saved time when a stack mold was removed and replaced with another stack mold, but did not solve the problem when the incoming mold was not a stack mold. In that case, the carriage assembly had to be dismounted from the machine by taking it apart.

There is a need for a mold carrier to which a stack mold can be quickly attached and yet remains safely installed in the machine when the stack mold is removed, and itself can be easily removed from the machine if required.

SUMMARY OF THE INVENTION

Accordingly, it is an object of the present invention to provide an improved mold carrier assembly for the mold center section of a stack mold.

It is a further object of the present invention to provide a mold carrier assembly as above that is stable when the mold center section of a stack mold is removed.

It is yet another object of the present invention to provide a mold carrier assembly as above which is easily aligned with the platens.

It is still another object of the present invention to provide a mold carrier assembly as above which can be quickly and conveniently removed if necessary.

The foregoing objects are attained by the improved mold carrier assembly of the present invention.

In accordance with the present invention, a mold carrier assembly for supporting a mold center section of a stack mold is provided. The mold carrier assembly has a pair of mold supports to which the mold center section can be attached. Each mold support is movable along a linear rail attached to the base of a molding machine and has at least one block containing a linear bearing mounted thereto for engaging the linear rail. Each mold support further includes a linkage assembly for connecting the mold support to other platens so as to synchronize movement of each mold support with movement of at least one other platen.

The present invention also relates to a molding machine incorporating said mold carrier assembly. The molding machine comprises a base having lateral support structures with each of said lateral support structures having at least one linear rail mounted thereon. The molding machine further has a stack mold system including a stationary platen fixed to the base, a movable platen, and a carrier assembly for supporting a mold center section. The carrier assembly comprises two mold supports with each of the mold supports having at least one block containing a linear bearing mounted thereto for allowing the respective mold support to slide along the at least one linear rail on a respective one of the lateral support structures.

Other details of the mold carrier assembly and the molding machine of the present invention, as well as other objects and advantages attendant thereto are set forth in the following detailed description and the accompanying drawings, in which like reference numerals depict like elements.

DETAILED DESCRIPTION OF THE PREFERRED EMBODIMENT(S)

Figure 1:
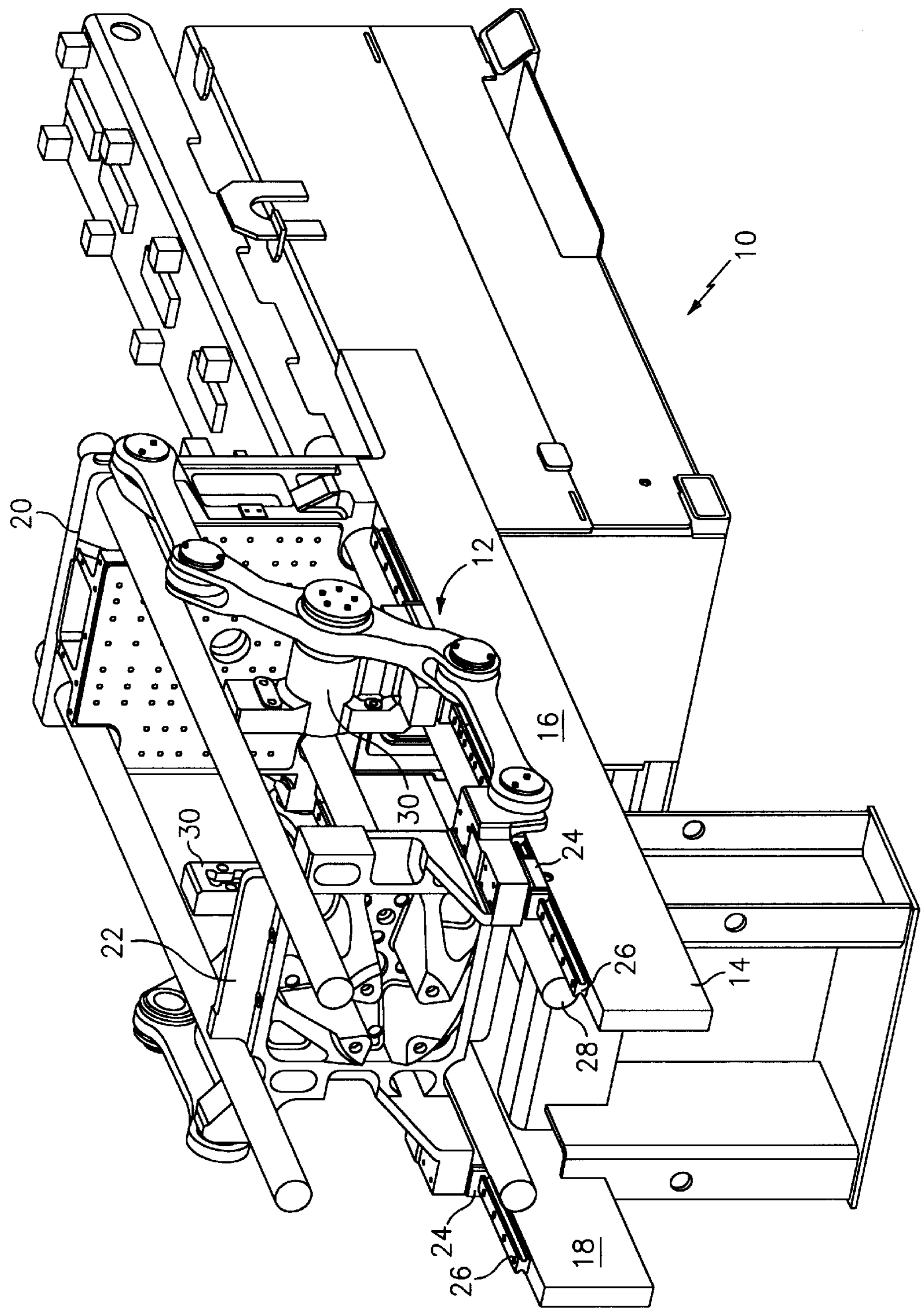
FIG. 1 is an isometric view of a machine base and platen assembly with a stack mold carrier assembly in accordance with the present invention installed.

Referring now to the drawings, FIG. 1 illustrates a molding machine 10 with the stack mold carrier assembly 12 of the present invention. The molding machine 10 has a clamp base 14 which includes two lateral support structures 16 and 18. The molding machine 10 further has two platens 20 and 22 to which molds (not shown) are attached. Platen 20 is a fixed or stationary platen, while platen 22 is a movable platen which rides on linear bearings 24 that engage fixed linear rails 26 fastened to the support structures 16 and 18. The molding machine 10 also includes means (not shown) for moving the platen 22 between mold closed and mold opened positions. The means for moving the platen 22 do not form part of the present invention and thus are not described in detail. Any suitable platen moving means known in the art may be used in the machine 10 to move the platen 22 between the mold closed and mold open positions. Tiebars 28 are provided to add structural support to the machine and extend from the stationary platen 20 to a mold clamping unit (not shown) or some other support (not shown). In the molding machine 10 of the present invention, the tiebars 28 are not used to align or support the moving platen 22 or the stack mold carrier assembly 12.

Figure 2:
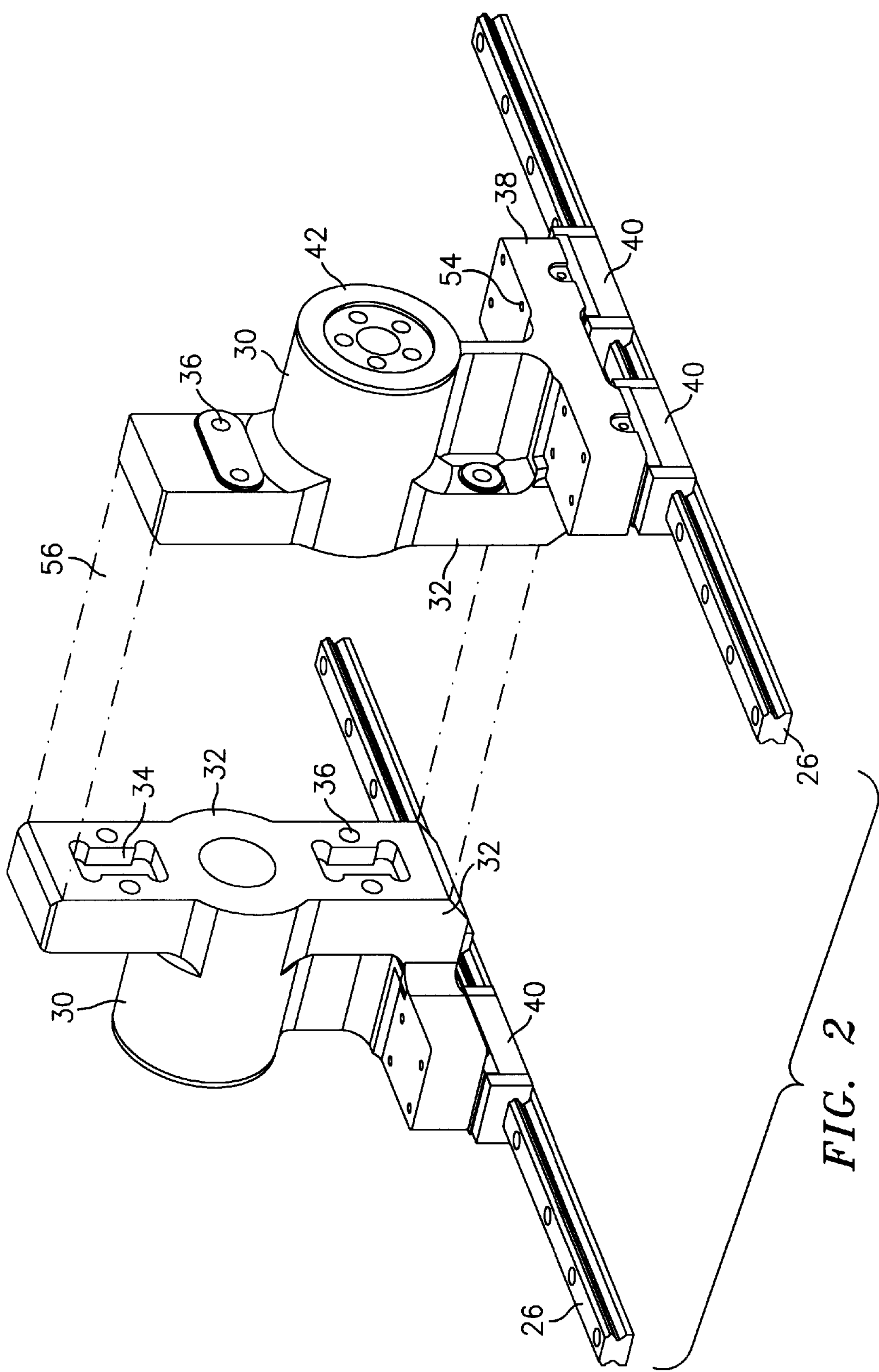
FIG. 2 is an isometric view of a linear bearing track and mold carrier pillars.

As shown in the drawings, the stack mold carrier assembly 12 for supporting a center mold section 56 comprises two mold supports or pillar castings 30 positioned on the support structures 16 and 18. Referring now to FIG. 2, each pillar casting 30 has a vertical post portion 32 that contains recesses 34 to accommodate keys (not shown) and through holes 36 for bolts. Both keys and bolts are used to align and fasten each pillar casting 30 to a respective side of a center mold section 56 (shown in dotted lines) of the stack mold in a known fashion. Each pillar casting 30 has a base support 38 to which is fastened one or more blocks 40 containing linear bearings that engage and run a respective linear rail 26 mounted to one of the side supports 16, 18. The linear rail 26 may be the same rail used to guide the moving platen 22 or may be a second rail mounted parallel to the linear rail used to guide the moving platen 22 and offset outboard to provide a dedicated alignment means for the stack mold carrier assembly pillar casting 30. This latter approach can be particularly useful if the support portion 38 must overlap the moving platen position when the moving platen 22 is in a mold closed position.

Figure 3:
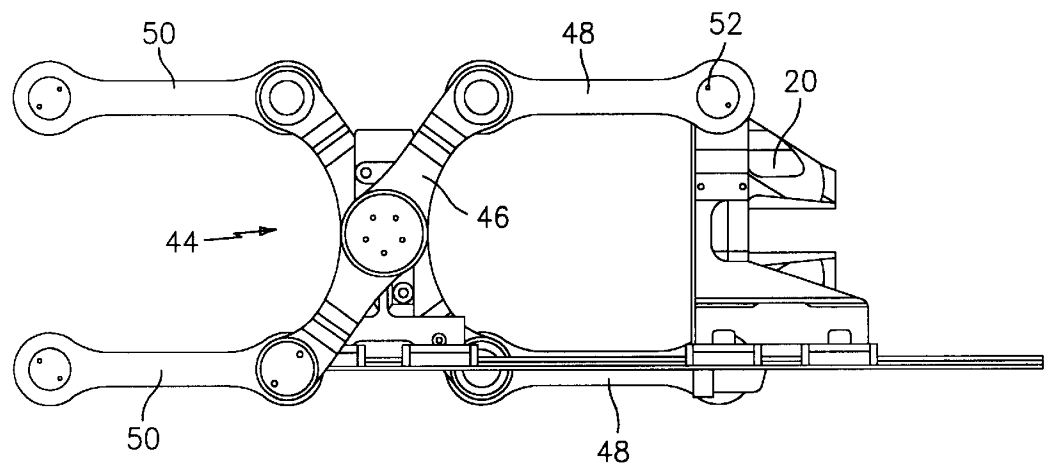
FIG. 3 is a side view of a carrier assembly pillar with a linkage assembly mounted.
Figure 4:
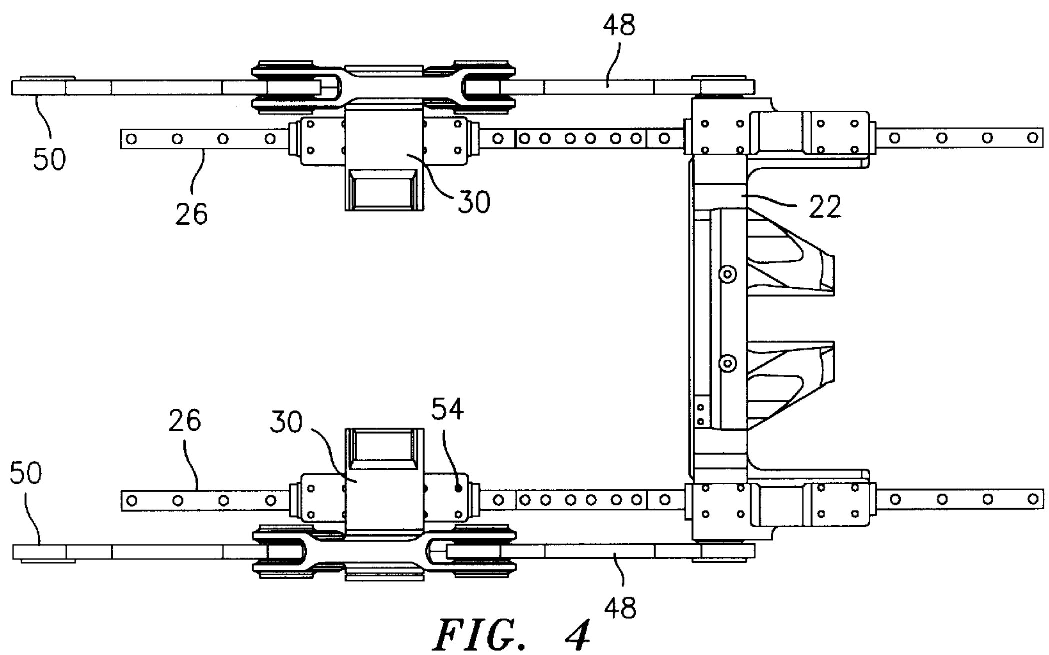
FIG. 4 is a top view of the carrier assembly pillars with the linkage assemblies mounted.
Figure 5:
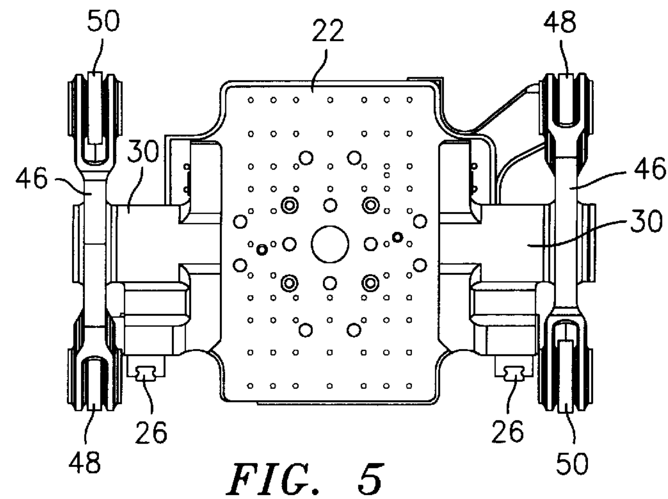
FIG. 5 is an end view of the carrier assembly pillars with linkage assembly mounted.

Each pillar casting 30 has a third portion, a boss 42, to which a carrier linkage assembly 44 is rotatably mounted. Any suitable connection means known in the art may be used to rotatably mount the linkage assembly 44 to the boss 42. The linkage assembly 44, as shown in FIGS. 3–5, has a propeller 46 rotatably mounted to the boss 42. The propeller 46 has links 48 and 50 rotatably mounted to its ends. Link 48 is rotatably mounted to the stationary platen 20, while link 50 is rotatably mounted to the moving platen 22. The motion of the moving platen 22 between mold closed and mold open positions causes the linkage assembly 44 to move each pillar casting 30 along a respective one of the rails 26 and maintain each pillar casting 30, and hence the center mold section (not shown), midway between the platens 20 and 22 for the entire platen stroke. This is a conventional and well known method of mold carrier movement.

Copending U.S. patent application Ser. No. 09/054,692, filed Apr. 13, 1998, now U.S. Pat. No. 6,027,681, which is incorporated in its entirety by reference herein, assigned to the assignee of the instant application, teaches a method where links of unequal length can be used to control the motion of the mold center section differently. If desired, the linkage system shown in the '692 patent application can be used in lieu of the linkage assembly 44.

In the event that the center mold section (not shown) of the stack mold assembly is removed from the machine 10 and from the stack mold carrier assembly 12, the carrier assembly 12 remains attached to the machine 10 and will not fall inward or outward because the support base 38 of each respective pillar casting 30 is firmly held by the linear bearing(s) in the block(s) 40 on a respective rail 26. Links 48 and 50 attached to the platens 20 and 22, respectively, also contribute to the stability of each pillar casting 30, and hence the carrier assembly 12, when the center mold is removed. As can be seen from the foregoing description, the design of the stack mold carrier assembly of the present invention provides a convenient and safe arrangement for loading and unloading stack molds.

A second advantage to the carrier assembly design of the present invention is that the pillar castings 30, and thus the carrier assembly 12, are easily aligned with the platens 20 and 22 as the pillar castings 30 share a common mounting means, namely the rails 26 attached to the machine base 14. This design avoids time consuming shimming to properly align the carrier assembly with the platens.

A third advantage to the carrier assembly design of the present invention is the ease of removal, when necessary, of each carrier assembly 12 from the machine 10. This can be quickly and conveniently achieved by removing the bolts 52 fastening the ends of the links 48 and 50 to the platens 20 and 22 and the bolts 54 securing each pillar casting 30 to the linear bearing block(s) 40. Each carrier assembly 12 can then be lifted away using a crane. Tiebar removal, or carrier disassembly, is not required in order to dismount each carrier assembly unlike earlier design.

It is apparent that there has been provided in accordance with the present invention a stack mold carrier mounted on linear bearings which fully satisfies the means, objects, and advantages set forth hereinbefore. While the present invention has been described in the context of specific embodiments thereof, alternatives, modifications, and variations will become apparent to those skilled in the art after reading the foregoing description. Therefore, it is intended to embrace such alternatives, modifications, and variations as fall within the broad scope of the appended claims.

What is claimed is:

1. A carrier assembly for supporting a mold center section of a stack mold, said assembly comprising:

a pair of mold supports for a mold center section;

each mold support being movable along a linear rail, said linear rail being located outboard of a space defined by a plurality of tiebars; and each mold support having at least one block containing a linear bearing mounted thereto for engaging said linear rail.

2. A carrier assembly according to claim 1, further comprising a linkage assembly attached to each mold support for joining said mold support to a plurality of platens.

3. A carrier assembly according to claim 2, wherein each mold support comprises a pillar casting having a vertical post portion containing keys and through holes for allowing the pillar casting to be aligned with and fastened to a side of a center mold section.

4. A carrier assembly according to claim 3, wherein each pillar casting has a base support portion to which each said linear bearing block is joined.

5. A carrier assembly according to claim 3, wherein each pillar casting has a boss to which said linkage assembly is rotatably mounted.

6. A carrier assembly according to claim 1, wherein each support has two blocks containing a linear bearing attached thereto and said blocks being spaced so as to provide improved stability to said support.

7. A carrier assembly according to claim 1, wherein each said block is mounted to said support by a plurality of bolts so as to facilitate removal of said support from said rails.

8. A molding machine comprising:

a base having lateral support structures;

each of said lateral support structures having at least one linear rail mounted thereon;

a stack mold system including a stationary platen fixed to said base, a movable platen, and a carrier assembly for supporting a mold section;

a plurality of tiebars extending from said stationary platen;

said carrier assembly comprising two mold supports;

each of said mold supports having at least one block containing a linear bearing mounted thereto for allowing said respective mold support to slide along said at least one linear rail on a respective one of said lateral support: structures; and said movable platen and each of said mold supports being unsupported by said tiebars.

9. A molding machine according to claim 8, further comprising each said mold support having a linkage assembly mounted thereto and said linkage assembly being connected to said stationary platen and said movable platen.

10. A molding machine according to claim 9, wherein said linkage assembly comprises a propeller mounted to said mold support, a first link connected to said propeller and said stationary platen, and a second link connected to said propeller and said movable platen.

11. A molding machine according to claim 10, wherein said first link is connected to said stationary platen by a plurality of removable bolts and said second link is connected to said movable platen by a plurality of removable bolts so as to facilitate removal of said mold support from said machine.

12. A molding machine according to claim 8, wherein each said mold support has two linear bearing blocks mounted thereto and said linear bearing blocks being spaced apart so as to provide improved stability to said mold support and to prevent inward movement of said mold support when said mold center section is removed.

13. A molding machine according to claim 8, wherein said at least one linear bearing block is mounted to said mold support by a plurality of removable bolts so as to facilitate removal of said mold support from said machine.

14. A molding machine according to claim 8, wherein each said mold support has a vertical post portion containing recesses to accommodate keys and through holes for bolts and is mounted to a respective side of said mold center section via said recesses and through holes.

15. A molding machine according to claim 14, wherein each said mold support further has a base support portion to which said at least one linear bearing block is joined.

16. A molding machine according to claim 14, wherein each said mold support further comprises a boss and a carrier linkage assembly mounted to said boss for joining said mold support to said stationary and movable platens, whereby movement of said movable platen causes said linkage assembly to move said mold support along said at least one rail and maintain the mold support midway between the movable platen and the stationary platen for an entire stroke of said movable platen.

17. A molding machine according to claim 8, wherein each lateral support structure has a single rail on which said movable platen and one of said mold supports run.

18. A molding machine comprising:

a base having lateral support structures;

each of said lateral support structures having at least one linear rail mounted thereon;

a stack mold system including a stationary platen fixed to said base, a movable platen, and a carrier assembly for supporting a mold center section;

said carrier assembly comprising two mold supports;

each of said mold supports having at least one block containing a linear bearing mounted thereto for allowing said respective mold support to slide along said at least one linear rail on a respective one of said lateral support structures; and each lateral support structure having two rails mounted thereto and said movable platen engaging and running on a first one of said rails and a respective one of said mold supports engaging and running on a second one of said rails.

* * * * *